United States Patent [19]

Christensen et al.

[11] 3,862,148

[45] Jan. 21, 1975

[54] P-(-)-(CIS-1,2-EPOXYPROPYL)-
ISOHYPOPHOSPHORIC ACID COMPOUNDS

[75] Inventors: Burton G. Christensen, Scotch Plains; Raymond A. Firestone, Fanwood, both of N.J.

[73] Assignee: Merck & Co., Inc., Rahway, N.J.

[22] Filed: Sept. 11, 1968

[21] Appl. No.: 759,246

[52] U.S. Cl.. 260/348 R, 260/247.7 D, 260/293.67, 260/326.5 D, 424/199, 424/200, 424/203
[51] Int. Cl. ............................................ C07f 9/38
[58] Field of Search................ 260/933, 348, 348 R

[56] References Cited
UNITED STATES PATENTS

| | | | |
|---|---|---|---|
| 2,787,629 | 4/1967 | Coover at al. | 260/933 X |
| 3,236,920 | 2/1966 | Hems et al. | 260/933 X |

OTHER PUBLICATIONS

Houben-Weyl, Methoden der Organischen Chemie, Vol. 12/1 (1963), page 612.

*Primary Examiner*—Norma S. Milestone
*Attorney, Agent, or Firm*—J. Jerome Behan; Hesna J. Pfeiffer

[57] ABSTRACT

Anhydrides of (-)(cis-1,2-epoxypropyl)-phosphonic acid are prepared by treating a (-)(cis-1,2-epoxypropyl)-phosphonic acid compound with an alkyl anhydride, by treating a (-)(cis-1,2-epoxypropyl)-phosphonic acid compound with ortho-phosphoric acid, or by treating an acid halide of (-)(cis-1,2-epoxypropyl)-phosphonic acid with an hydroxyl containing compound. The (-)(cis-1,2-epoxypropyl)-phosphonic acid anhydrides are active antibacterial agents.

2 Claims, No Drawings

P-(−)-(CIS-1,2-EPOXYPROPYL)-ISOHYPOPHOSPHORIC ACID COMPOUNDS

BACKGROUND OF THE INVENTION

Although many valuable antibiotics are known for the treatment of various diseases, many of the known antibiotics are, in general, active against a limited number of pathogens. When certain strains of these pathogens develop resistance to a particular antibiotic, the antibiotic is rendered inactive against such resistant strains. Because of this development with regard to known antibiotics, the search continues in an effort to discover new antibacterial agents which are active against a wide range of pathogens and in particular against those strains of pathogens which are resistant to the known antibiotics.

DESCRIPTION OF THE PREFERRED EMBODIMENTS

The present invention relates to compounds which have significant antibacterial activity and to processes for preparing them. The compounds which are the subject of this invention are anhydrides of (−) (cis-1,2-epoxypropyl)-phosphonic acid. The novel anhydrides within the scope of the invention may be depicted as follows:

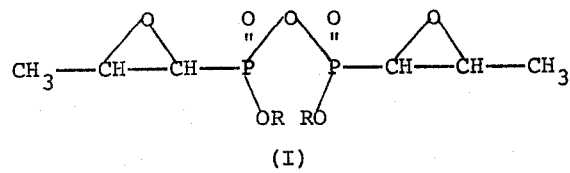

(I)

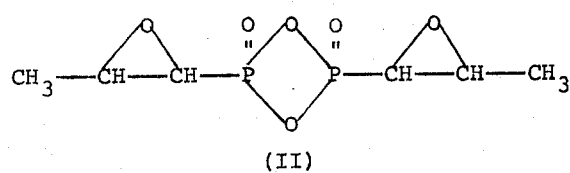

(II)

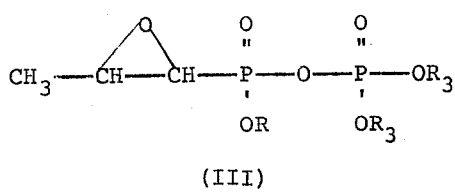

(III)

where $R_3$ is hydrogen, loweralkyl such as methyl, ethyl, propyl and butyl, benzyl, or a metal cation such as ammonium, sodium, potassium, calcium, magnesium, aluminum, silver, or iron; and R is hydrogen or a substituted or unsubstituted hydrocarbyl radical wherein the hydrocarbyl radical is loweralkyl, such as methyl, propyl, t-butyl, chlorethyl, bromoethyl, dichloroethyl, loweralkenyl such as allyl, methallyl, hexenyl, loweralkynyl such as propargyl, ethynyl, or chloroethynyl, cycloalkyl such as cyclohexyl, cyclohexenyl, or cyclopropyl, aryl, aralkyl or heteroaryl. Where R is aliphatic, it preferably has from 1–6 carbon atoms.

Where R is an araliphatic radical, it may be aralkyl such as benzyl, phenethyl, p-halobenzyl, nitrobenzyl and the like.

Where R is an aryl radical, it may be a radical such as phenyl, substituted phenyl such as p-chlorophenyl, o-nitrophenyl, or naphthyl. When R is heterocyclic, it may be heteroaromatic, such as pyridyl, thienyl, thiazolyl, or it may represent a saturated hetero ring such as piperazine.

Also encompassed by this invention are the salts of Compounds I and III where R is hydrogen. The salts constitute a preferred aspect of the invention because they are generally more stable than the corresponding free acid. Inorganic salts such as the sodium, aluminum, potassium, ammonium, calcium, magnesium, silver and iron salts, as well as organic amine salts such as salts of primary, secondary, or tertiary amines, for example the monoalkylamines, dialkylamines, trialkylamines, and nitrogen containing heterocyclic amines are within the salts contemplated. Salts of amines such as α-phenethylamine, diethylamine, quinine, brucine, lysine, ethanolamine, morphine, benzylamine, piperazine, and the like are examples of such amine salts. Where desired the salt be that of a biologically active amine, such as erthromycin, oleandomycin, or novobiocin.

Representative examples of the novel anhydrides of Formula I are disodium-bis-(−) (cis-1,2-epoxypropyl)-pyrophosphonate, dimethyl-bis-(−) (cis-1,2-epoxypropyl)- pyrophosphonate, dibutyl-bis-(−) (cis-1,2-epoxypropyl)-pyrophosphonate, diphenyl-bis-(−) (cis-1,2-epoxypropyl)-pyrophosphonate, dibenzyl-bis-(−) (cis-1,2-epoxypropyl)-pyrophosphonate, dicalcium-bis-(−) (cis-1,2-epoxypropyl)-pyrophosphonate, and dibenzylammonium-bis-(−) (cis-1,2-epoxypropyl)-pyrophosphonate.

The compounds of Formula III may be represented by p-(−) (cis-1,2-epoxypropyl)-isohypophosphoric acid, sodium-P-(−) (cis-1,2-epoxypropyl)-isohypophosphoric acid disodium salt, benzylammonium-P-(−) (cis-1,2-epoxypropyl)-isohypophosphoric acid dibenzylammonium salt, methyl-P-(−) cis-1,2-epoxypropyl)-isohypophosphoric acid dipotassium salt, phenyl-P-(−) (cis-1,2-epoxypropyl)-isohypophosphoric acid, benzyl-P-(−(cis-1,2-epoxypropyl)-isohypophosphoric acid dicalcium salt, and the compound of Formula II is (−) (cis-1,2-epoxypropyl)-phosphonic acid cyclic dianhydride.

The compounds of Formula I, hereinafter referred to as pyrophosphonates, can be prepared by the reaction of a phosphonic acid compound such as, for example, (−) (cis-1,2-epoxypropyl)-phosphonic acid, or a metal salt of the acid such as, for example, the sodium, potassium, calcium, magnesium, aluminum, cobalt, or iron salts or a monoester of the phosphonic acid, such as the hydrocarbyl esters wherein the hydrocarbyl radical is as defined above, with a loweralkyl anhydride such as acetic anhydride, propionic anhydride, or butanoic anhydric. Although the reaction may be carried out on the free acid, a mono- salt, or a monoester of the acid, it is preferred to run the reaction on a salt of the acid since better yields of the pyrophosphonate are obtained where a salt of the acid is employed as the starting material. The reaction is generally run at temperatures between 25°–100°C., but it is preferred to carry out the reaction at a temperature between about 50°–75°C.

Any inert anhydrous solvent may be employed for the reaction such as ether, tetrahydrofuran, benzene, toluene, and the like. The reaction mixture is generally stirred at the reaction temperature for about 1–5 hours, after which the mixture is cooled, and the anhydride is isolated from the reaction mixture by techniques known in the art.

The cyclic dianhydride (II) can be prepared by reacting a (−) (cis-1,2-epoxypropyl)-phosphonic acid dihalide such as (−) (cis-1,2-epoxypropyl)-phosphonic acid dichloride or (−) (cis-1,2-epoxypropyl)-phosphonic acid dibromide, with at least one equivalent of water. The dihalide is generally dissolved in an anhydrous solvent such as, for example, benzene, toluene, or methylene chloride, and the water is then added to the solution of the dihalide, while maintaining the temperature of the reaction mixture between about 5°–15°C. After the evolution of the hydrohalide gas ceases, the mixture is generally heated to remove any remaining traces of gas, and to ensure complete reaction. The cyclic dianhydride is then separated from the reaction mixture by techniques known in the art.

Alternatively, the cyclic dianhydride can be prepared by reacting a (−) (cis-1,2-epoxypropyl)-phosphonic dihalide with about one equivalent of (−) (cis-1,2-epoxypropyl)-phosphonic acid. The reaction may be carried out at room temperature or at a temperature up to 125°C., but is preferably carried out at the reflux temperature of the solvent employed. Any anhydrous solvent such as benzene, toluene or chloroform may be employed, but it is preferred to use an amine solvent such as pyridine or triethylamine so as to trap the hydrohalide released during the reaction.

The mixed anhydrides of Formula III can be prepared by reacting a (−) (cis-1,2-epoxypropyl)-phosphonic acid compound such as, for example, the morpholine salt of (−) (cis-1,2-epoxypropyl)-morpholinophosphinic acid with ortho-phosphoric acid in the presence of an organic base. The overall reaction may be depicted as follows:

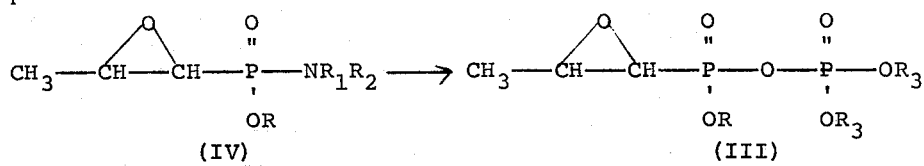

where R, $R_1$ and $R_2$ are hydrogen or a hydrocarbyl radical, and $R_3$ is hydrogen, loweralkyl such as methyl, ethyl, propyl and butyl, or a metal cation such as sodium, ammonium, potassium, calcium, magnesium, aluminum and the like. In addition, the starting compound (IV) may be an amine salt such as a morpholinium, phenethylammonium or triethylammonium salt. As the organic base, any tertiary amine such as t-butyl amine, t-ethylamine or t-methylamine may be employed. It is preferred to employ a dry organic solvent for this reaction, such as benzene or toluene; a basic solvent, such as pyridine, may also be employed. Where the starting phosphonic acid compound is a salt, or the free acid, it is convenient to employ an amine as the solvent. Where an amine is employed as the solvent, the anhydride is obtained as the amine salt in those cases where R in Formula IV is hydrogen. Also included are those compounds where $-NR_1R_2$ represents the residue of a cyclic amine such as, for example, morpholine, piperidine, or pyrrolidine. Where R, $R_1$ and $R_2$ represent a hydrocarbyl radical, the hydrocarbyl radical is as defined above. It is essential that the reactants and equipment be dry in order to obtain the compounds of Formula III in good yield. For this reason, the reactants are generally dried just before carrying out the reaction. The reaction is generally carried out at room temperature, and the reaction mixture is stirred for 5–50 hours to ensure complete reaction. The reaction may be carried out at higher temperatures but higher temperatures generally result in a lower yield of the anhydride.

The starting material for the reaction with orthophosphoric acid can be prepared by reacting a (−) (cis-1,2-epoxypropyl)-phosphonic acid compound such as, for example, the morpholine salt of (−) (cis-1,2-epoxypropyl)-phosphonic acid with a carbodiimide, such as, for example, dicyclohexylcarbodiimide, in the presence of a primary or secondary amine such as, for example, dimethylamine, or morpholine.

(−) (cis-1,2-epoxypropyl)-phosphonic acid and its salts are prepared by aerobic fermentation of suitable aqueous nutrient media under controlled conditions by certain strains of the genus Streptomyces such as *Streptomyces fradiae* [MA-2915, NRRL-3417], *Streptomyces wedmorensis* [MA-3269, ATCC 21239], and *Streptomyces viridochromogenes* [MA-2903, NRRL-3413]. The fermentation is carried out at temperatures ranging from about 25°–38°C. The pH of the nutrient media suitable for growing the Streptomyces and producing the phosphonic acid compound can vary from about 5.5–7.5. (−) (Cis-1,2-epoxypropyl)-phosphonic acid may then be isolated from the fermentation broth by adsorption on either basic or acid-washed alumina. The adsorbed material can be eluted from the alumina by aqueous or aqueous alcoholic ammonium hydroxide solution having a pH of about 11.2 and fractionally collecting the eluate. The ammonium salt is obtained in this way. Other salts may be obtained by passing a solution of the ammonium salt over an appropriate cation exchange resin or by other techniques known in the art.

The monoesters of (−) (cis-1,2-epoxypropyl)-phosphonic acid can be prepared from the corresponding diesters. The diesters are obtained by reacting (−) (cis-1,2-epoxypropyl)-phosphonic dichloride with 2 molar equivalents of an alcohol. The monoester is then obtained by removal of one of the ester radicals from the di- ester with base. A mono- salt mono- ester may then be prepared by reacting the monoester with one equivalent of base.

The phosphonic dihalides can be prepared by reacting (−) (cis-1,2-epoxypropyl)-phosphonic acid with a halogenating agent such as thionyl chloride or thionyl bromide.

The (−) (cis-1,2-epoxypropyl)-phosphonic acid anhydrides are effective in inhibiting the growth of various microorganisms. In general, they have been shown to inhibit the growth of Staphylococci and Salmonella. Illustrative of such pathogens are *Salmonella Schottmuelleri*, *Salmonella gallinarum*, and *Staphylococcus aureus* and *Staphylococcus pyogenes*.

The anhydrides can be used as antiseptic agents to remove susceptible organisms for pharmaceutical, dental and medical equipment and other areas subject to infection by such organisms.

Since the antibiotic and its salts are very active in inhibiting the growth of various species of Salmonella, it can be used as a disinfectant in washing eggs and areas subject to infection by Salmonella. The salts of (−) (cis-1,2-epoxypropyl)-phosphonic acid anhydrides and hydrocarbyl esters and salts thereof are also useful as bactericides in various industrial applications, for example in inhibiting undesirable bacterial growth in the white water in paper mills and in paints such as polyvinyl acetate latex paint.

The anhydrides are also useful in the treatment of diseases caused by bacterial infections in animals.

The following examples are given for purposes of illustration and not by way of limitation:

EXAMPLE 1

P-(−)(CIS-1,2-EPOXYPROPYL)-ISOHYPOPHOSPHORIC ACID

Morpholinium-(−) (cis-1,2-epoxypropyl)-morpholinophosphinate (1.55 grams) in 36 ml. of pyridine is concentrated to dryness in vacuo, and an additional 36 ml. of pyridine is added to the residue. This process is repeated three times to ensure complete dryness. To the resulting dry solution of the morpholinophosphonic acid salt is added a solution of 85% ortho-phosphoric acid (1.45 ml.), tertiary butylamine (1.43 ml.), and 72 ml. of dry pyridine. The resulting solution is stirred for 50 hours, after which the solvent is removed in vacuo and the residue is flushed three times with 20 ml. of water. Upon removal of the water and drying of the residue, P-(−) (cis-1,2-epoxypropyl)-isohypophosphoric acid is obtained as a pyridine salt.

When in the above procedure methyl-(−) (cis-1,2-epoxypropyl)-morpholinophosphinate is employed in place of morpholinium-(−) (cis-1,2-epoxypropyl)-morpholinophosphinate, methyl-P-(−) (cis-1,2-epoxypropyl)-isohypophosphoric acid is obtained and is characterized by NMR.

EXAMPLE 2

DISODIUM-BIS-(−)(CIS-1,2-EPOXYPROPYL)-PYROPHOSPHONATE

Disodium-(−) (cis-1,2-epoxypropyl)-phosphonate (9.2 grams) is suspended in 75 ml. of acetic anhydride. The suspension is stirred at 75°C. for 2½ hours, cooled to 25°C., stirred with 500 ml. of ether, and filtered. The filter cake is triturated with 500 ml. of ether, and the solid is filtered off and washed with ether. After drying the residue at 40°C. in vacuo, the disodium salt of bis-(−) (cis-1,2-epoxypropyl)-pyrophosphonate is obtained and is characterized by infrared and NMR spectra.

EXAMPLE 3

(−) (CIS-1,2-EPOXYPROPYL)-PHOSPHONIC ACID CYCLIC DIANHYDRIDE (−) (Cis-1,2-epoxypropyl)-phosphonic dichloride (0.1 mole) is suspended in anhydrous benzene. Water (0.1 mole) is added slowly to the suspension with stirring while keeping the temperature of the reaction mixture below 10°C. by external cooling. After the evolution of gas ceases, the mixture is heated to 120°C. at 50mm. pressure until no further gas evolution is observed. Upon evaporation of the solvent, (−) (cis-1,2-epoxypropyl)-phosphonic acid cyclic dianhydride is obtained and is characterized by NMR.

EXAMPLE 4

(−) (CIS-1,2-EPOXYPROPYL)-PHOSPHONIC ACID CYCLIC DIANHYDRIDE (−) (Cis-1,2-epoxypropyl)-phosphonic acid (0.1 mole) and (−) (cis-1,2-epoxypropyl)-phosphonic dichloride (0.1 mole) are suspended in 100 ml. of pyridine. The reaction mixture is heated at 40°C. with stirring for 3 hours. The solvent is removed in vacuo, and the residue is taken up into 50 ml. of methylene chloride. The methylene chloride solution is washed with 2 × 15 ml. of water, and upon removal of the solvent, (−) (cis-1,2-epoxypropyl)-phosphonic acid cyclic dianhydride is obtained.

The starting materials used in the preparation of the compounds of this invention can be prepared as follows:

A. (−) (Cis-1,2-epoxypropyl)-phosphonic dichloride (−) (Cis-1,2-epoxypropyl)-phosphonic acid (1.38 grams, 0.01 mole) and 1.6 ml. of pyridine are placed in 20 ml. of benzene, and to the resulting mixture is added with stirring 2.4 grams (0.020 mole) of thionyl chloride. The reaction mixture is stirred at room temperature for three hours, after which the solution is decanted from the gummy precipitate and is concentrated in vacuo at room temperature. Upon flask distillation of the residue at 0.5 mm., (−) (cis-1,2-epoxypropyl)-phosphonic dichloride, b.p. 32°–33°C., is obtained as a clear, colorless liquid.

B. Monoester of (−) (cis-1,2-epoxypropyl)-phosphonic acid

A stirred mixture of (−) (cis-1,2-epoxypropyl)-phosphonate. (−) (cis-1,2-epoxypropyl)-phosphonic dichloride (0.1 mole) and triethylamine (0.2 mole) in 100 ml. of benzene is cooled to 5°C. Methyl alcohol (0.2 mole) is added to the mixture at such a rate so as to maintain the temperature at 5°–10°C. After the addition is complete, the mixture is stirred at room temperature for one hour. The precipitated triethylamine hydrochloride salt is filtered off, and the solvent is removed in vacuo leaving dimethyl-(−) (cis-1,2-epoxypropyl)-phosphonate as the residue. The dimethyl ester is dissolved in 75 ml. of water and to the resulting solution is added dropwise with stirring 0.1 mole of sodium hydroxide during 5 hours while maintaining the pH between 8.5–11.0. The solution is kept at room temperature for 18 hours, after which the solvent is removed in vacuo. The residue is dissolved in methanol, and sodium methyl-(−) (cis-1,2-epoxypropyl)-phosphonate is precipitated by the addition of ether and recovered by filtration.

C. (−) (Cis-1,2-epoxypropyl)-morpholinophosphinic acid morpholine salt phenethylammonium-(−) (cis-1,2-epoxypropyl)-phosphonate (2.59 grams) is passed through an ice water jacketed column of Dowex 50 (H$^+$) resin (40 grams) and is eluted with ice water. The eluent (450 ml.) is immediately neutralized with freshly treated morpholine (860 mg.), and the aqueous solution is lyophilized.

A solution of dicyclohexylcarbodiimide (8.24 grams) in 150 ml. of t-butanol is added dropwise to a refluxing solution of the lyophilized material, 100 ml. of t-butanol, 100 ml. of water, and 2.61 ml. of morpholine during 3 hours. After the addition is complete, the refluxing is continued for an additional hour. The reaction mixture is then cooled to room temperature and is filtered free of dicyclohexylurea. The filter cake is washed with t-butanol and the filtrate is evaporated in vacuo until all of the t-butanol is removed. The aqueous solution is extracted 3 times with ether, and upon lyophilization of the aqueous solution, (−) (cis-1,2-epoxypropyl)-morpholinophosphonic acid morpholine salt is obtained.

D. (−) (Cis-1,2-epoxypropyl)-phosphonic acid

A lyophilized culture of *Streptomyces fradiae* [MA-2913 (ATCC 21099)] is used to inoculate 50 ml. of sterile medium of the following composition in a 250 ml. baffled Erlenmeyer flask:

|  | grams/liter |
| --- | --- |
| Ground oatmeal | 10 |
| Yeast hydrolysate | 10 |
| $MgSO_4 \cdot 7H_2O$ | 0.05 |
| Phosphate buffer* | 2 ml. |
| Water q.s. | Balance |

*91 grams $KH_2PO_4$ and 95 grams $Na_2HPO_4$ made up to 1 liter with distilled water.

The medium is adjusted to pH 6.5 prior to sterilization.

The inoculated flask is incubated at 28°C. for 24 hours on a rotary shaker. 10 Ml. of the resulting broth is used to inoculate a second 250 ml. Erlenmeyer flask containing 50 ml. of the same sterile medium. After incubation at 28° C. for 24 hours on a rotary shaker, the resulting fermentation broth is used to inoculate a 5 liter fermenter containing 3 liters of sterile nutrient broth of the following composition:

|  | grams/liter |
| --- | --- |
| Ground oatmeal | 30 |
| Distillers solubles | 10 |
| Soybean meal | 25 |
| Sodium citrate | 4 |
| Sodium ascorbate | 0.5 |
| Water, q.s. | Balance |

The medium is adjusted to pH 6.5 before sterilizing.

The inoculated medium is then incubated at 28°C. for 4 days while agitating and aerating the fermentation broth with 3 liters of air per minute. 3 Ml. of a propylene glycol polymer having a molecular weight of about 2,000 (sold under the trade name of Polyglycol P-2000 by the Dow Chemical Company) being added to prevent excessive foaming. The resulting fermentation broth has an activity of 5.9 units/ml. as determined by the standard assay using *Proteus vulgaris*.

A second fermentation using this same procedure results in a broth having an activity of 6.75 units/ml.

The broths from the two fermentations are combined and filtered. The resulting filtered broth contains 20 mg. of solids per ml, and at a dilution of 1 to 32 gives a 25 mm. zone of inhibition when tested against *Proteus vulgaris* using the modified assay procedure.

96.5 Ml. of the broth is stirred for 40 minutes with 2.5 grams of acid-washed alumina. The mixture is then filtered, and the filtrate is found to contain 20% of the activity. The filtered alumina adsorbate is washed and eluted with aqueous ammonia at a pH of 11.2. The eluate is evaporated to remove ammonia and is found to give a 25 mm. inhibition zone at a dilution of 0.125 mg./ml. by the modified assay procedure.

To 10 ml. of an aqueous solution of the ammonium salt of (−) (cis-1,2-epoxypropl)-phosphonic acid containing 200 mg. of solids and having a total activity of 54,000 units is added 100 mg. of sodium hydroxide, and the resulting solution is diluted to 20 ml. with water and filtered. The filtrate is concentrated to about 8.5 in vacuo with heating. The resulting concentrate is allowed to stand until the sodium salt of (−) (cis-1,2-epoxypropyl)-phosphonic acid starts to crystallize from solution, and the crystallization is allowed to continue with stirring overnight (17 hours). The crystalline product is filtered off and is washed with a small amount of 50% aqueous methanol followed by a small amount of methanol. After drying the crystalline residue in vacuo at room temperature, the sodium salt of (−) (cis-1,2-epoxypropyl)-phosphonic acid is obtained.

It should be understood that although this invention has been described with reference to particular embodiments thereof, changes and modifications may be made which are within its intended scope, and it should be limited only by the language of the appended claims.

What is claimed is:

1. P-(−) (cis-1,2-epoxypropyl)isohypophosphoric acid and metal and amine salts thereof.

2. The compound of claim 1, which compound is P-(−)(cis-1,2-epoxypropyl)-isohypophosphoric acid.

* * * * *